(12) United States Patent
Delnick et al.

(10) Patent No.: US 6,316,142 B1
(45) Date of Patent: Nov. 13, 2001

(54) ELECTRODE CONTAINING A POLYMERIC BINDER MATERIAL, METHOD OF FORMATION THEREOF AND ELECTROCHEMICAL CELL

(75) Inventors: Frank M. Delnick, Norton, MA (US); Alan Iwamoto, Ann Arbor, MI (US); Zhendong Hu, Ann Arbor, MI (US); Liya Wang, Ann Arbor, MI (US)

(73) Assignee: Imra America, Inc., Ann Arbor, MI (US)

( * ) Notice: Subject to any disclaimer, the term of this patent is extended or adjusted under 35 U.S.C. 154(b) by 0 days.

(21) Appl. No.: 09/281,922

(22) Filed: Mar. 31, 1999

(51) Int. Cl.$^7$ ........................................ H01M 4/62
(52) U.S. Cl. ..................... 429/217; 29/623.3; 29/623.5
(58) Field of Search ..................... 429/217; 29/623.1, 29/623.5

(56) References Cited

U.S. PATENT DOCUMENTS

| | | |
|---|---|---|
| 3,696,061 | 10/1972 | Selsor et al. . |
| 3,852,113 * | 12/1974 | Yokada et al. ..................... 136/83 R |
| 4,018,971 | 4/1977 | Sheibley et al. . |
| 4,226,926 | 10/1980 | Goldberg et al. . |
| 4,228,228 | 10/1980 | Beauchamp . |
| 4,237,083 | 12/1980 | Young et al. . |
| 4,624,902 | 11/1986 | deNeufville et al. . |
| 4,681,750 | 7/1987 | Johnson et al. . |
| 4,683,264 | 7/1987 | Urata et al. . |
| 4,731,310 | 3/1988 | Anderman et al. . |
| 4,810,755 | 3/1989 | Akazawa et al. . |
| 4,857,600 | 8/1989 | Gross et al. . |
| 5,194,341 | 3/1993 | Bagley et al. . |
| 5,268,329 | 12/1993 | Chittipeddi et al. . |
| 5,325,601 | 7/1994 | Brownewell et al. . |
| 5,336,573 | 8/1994 | Zuckerbrod et al. . |
| 5,350,645 | 9/1994 | Lake et al. . |
| 5,384,685 | 1/1995 | Tong et al. . |
| 5,401,596 | 3/1995 | Stoilov et al. . |
| 5,429,891 | 7/1995 | Gordz et al. . |
| 5,436,093 | 7/1995 | Huang et al. . |
| 5,464,707 | 11/1995 | Moulton et al. . |
| 5,480,939 * | 1/1996 | Jackson et al. ..................... 525/120 |
| 5,565,284 * | 10/1996 | Koga et al. ..................... 429/218 |
| 5,571,634 | 11/1996 | Gozdz et al. . |
| 5,587,253 | 12/1996 | Gozdz et al. . |
| 5,631,103 | 5/1997 | Eschbach et al. . |
| 5,739,234 | 4/1998 | Kashio et al. . |
| 5,747,190 * | 5/1998 | Lake ..................... 429/124 |
| 5,865,860 | 2/1999 | Delnick . |
| 6,148,503 | 11/2000 | Delnick et al. . |

\* cited by examiner

*Primary Examiner*—Carol Chaney
(74) *Attorney, Agent, or Firm*—Burns, Doane, Swecker & Mathis, LLP

(57) ABSTRACT

Provided are methods of forming an electrode suitable for use in an electrochemical cell, and novel electrodes which can be formed therefrom. The methods involve the steps of: (a) forming an electrode slurry from components comprising a solvent, a polymeric binder material and a solid electrode material, wherein the polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule; (b) coating the electrode slurry on a substrate; and (c) evaporating the solvent. Also provided are electrochemical cells which include the inventive electrodes. The invention has particular applicability to the manufacture of nonaqueous electrochemical power supplies.

22 Claims, 3 Drawing Sheets

ELECTRODE CONTAINING A POLYMERIC BINDER MATERIAL, METHOD OF FORMATION THEREOF AND ELECTROCHEMICAL CELL

BACKGROUND OF THE INVENTION

1. Field of Invention

The present invention relates to novel methods of forming electrodes suitable for use in an electrochemical cell. The invention also relates to novel electrodes which can be formed by such methods. The invention further relates to electrochemical cells which include the inventive electrodes. The invention has particular applicability to the manufacture of nonaqueous electrochemical cells.

2. Description of the Related Art

Electrochemical cells, for example, nonaqueous power supplies are formed from various components such as electrodes, separators and seals. These components are typically formed from finely divided particulate materials, the particles of which must be bonded together to form cohesive structures which in turn may also be bonded to other structural element(s) in the power supply. This function of bonding materials together is conventionally accomplished by the use of monomers, polymers, copolymers or mixtures thereof, collectively referred to as binders for these applications.

Binders in electrochemical cells should be insoluble in the electrolyte and chemically inert with respect to the other materials in the cell. The binders should not be oxidized or reduced within the cell, and the binders should be thermally stable during storage and over the operating temperature range of the cell. The binder should also have sufficient mechanical integrity and flexibility to bond the appropriate materials of the cell and to prevent cracking, spalling, exfoliation and other forms of mechanical disintegration caused by thermal expansion/contraction or by the expansion/contraction which accompanies the charge/discharge cycling of the cell.

A commonly used polymer binder is polytetrafluoroethylene (PTFE), sold under the tradename TEFLON®. This material is chemically inert and does not dissolve in electrolytes or solvents. Because of the chemical inertness of this binder, electrodes are difficult and laborious to fabricate, and adhesion to current collectors is poor. Typically, thick electrodes must be made by blending aqueous dispersions of PTFE with active electrode ingredients and conductive additives. The slurry formed is then drawn, shaped and kneaded to the desired consistency. It is then formed into an electrode and baked at high temperature to remove the water. The electrode is then pressed into current collector grids. PTFE flows plastically under compression and it is lyophobic to most electrolytes. This material is not suitable for advanced high power cells with thin electrodes on foil current collectors.

Polyethylene is also widely used in nonaqueous electrochemical cells. See U.S. Pat. No. 4,731,310, to Anderman et al. This material is commonly used as a binder for anode and cathode composites, and it is a major ingredient in some separators and seals. A copolymer consisting of ethylene and chlorotrifluoroethylene (ECTFE), commercially available under the tradename HALAR®, has also been used as a binder in nonaqueous cells. See U.S. Pat. No. 4,228,228, to Beauchamp. Unlike PTFE, polyethylene and chlorotrifluoroethylene components can be melted and hot blended together with powdered components. Electrodes or separators are typically hot pressed or extruded to shape, which processes avoid the use of solvents. The hot viscous pastes are not, however, suited to the manufacture of thin electrodes on thin foil current collectors, and adhesion to most surfaces is relatively poor.

Improved manufacturability of thin electrodes has been achieved by the use of soluble fluorinated homopolymers such as polyvinylidene fluoride (PVDF) or copolymers of vinylidene fluoride and hexafluoropropylene (VF2-HFP), or of vinylidene fluoride and chlorotrifluoroethylene (VF2-CTFE). See U.S. Pat. Nos. 5,571,634 and 5,587,253, to Gozdz et al. These homopolymers or copolymers are typically dissolved in a solvent such as N-methyl pyrrolidone, and then blended into a slurry with the active electrode material and a carbon conductive additive. The slurry is coated onto a foil current collector, and the solvent is evaporated to yield an electrode structure. While this process can yield thin electrodes, adhesion of the electrode to the current collector is still poor and often requires the use of adhesion promoters. Furthermore, the fluorinated polymers are partially soluble in the alkene carbonate electrolytes which are commonly used in electrochemical cells. The fluorinated polymers also form gels and swell in the presence of alkylene carbonate electrolytes.

Improvement in adhesion and solvent resistance has been achieved by the copolymerization of vinylidene fluoride monomers with (a) epoxy groups containing vinyl monomers and (b) unsaturated dibasic acid monoester, as disclosed in U.S. Pat. No. 5,739,234, to Kashio et al.

U.S. Pat. No. 5,436,093, to Huang et al, discloses that ethylene propylene diene monomer (EPDM) can be used as a binder for carbon anode electrodes in lithium-ion batteries. These electrodes are coated to thicknesses of 10 to 15 mil (254 to 381 $\mu$m).

U.S. Pat. Nos. 4,810,755, to Akazawa et al, and 4,857,600, to Gross et al, disclose that polymers containing grafted maleic acid or maleic anhydride have improved adherence to metal foils such as aluminum foil used in food wraps. These documents, however, disclose the use only of nonchlorinated polymers.

U.S. Pat. No. 5,464,707, to Moulton et al, discloses that polymers containing grafted acid functionalities can be used in electrically conductive adhesion promoters in electrochemical cells. Specifically, maleic anhydride can be grafted onto a polymer and subsequent hydrolysis of the maleic anhydride will provide for the adhesion promoting carboxylic acid functionality on the polymer. This document, however, only discloses nonchlorinated polymers. Furthermore, polymers that contain grafted acid functionalities are disclosed only as binders in adhesion promoting films, and not as binders in anode, cathode or separator elements.

To meet the requirements of the electrochemical cell manufacturing industry, and to overcome the disadvantages of to the related art, it is an object of the present invention to provide novel methods of forming electrodes suitable for use in an electrochemical cell. Through the invention, it has been found that hardenable coating compositions previously formulated for protecting and/or beautifying polypropylene resins can effectively be employed as a binder in nonaqueous electrochemical cells. The coating composition of the invention is readily soluble in selected solvents, so that anode and cathode slurries or inks can be formulated and coated or printed onto current collector substrates. The resulting anode or cathode structures have improved performance when compared with electrodes of the related art.

It is a further object of the invention to provide novel electrodes which can be formed by the inventive methods.

It is yet a further object of the invention to provide novel electrochemical cells which include the inventive electrodes.

Other objects and aspects of the present invention will become apparent to one of ordinary skill in the art on a review of the specification, drawings and claims appended hereto.

BRIEF DESCRIPTION OF THE DRAWINGS

The objects and advantages of the invention will become apparent from the following detailed description of the preferred embodiments thereof in connection with the accompanying drawings, in which like features are designated by like reference numerals, and in which.

SUMMARY OF THE INVENTION

Figure 1:
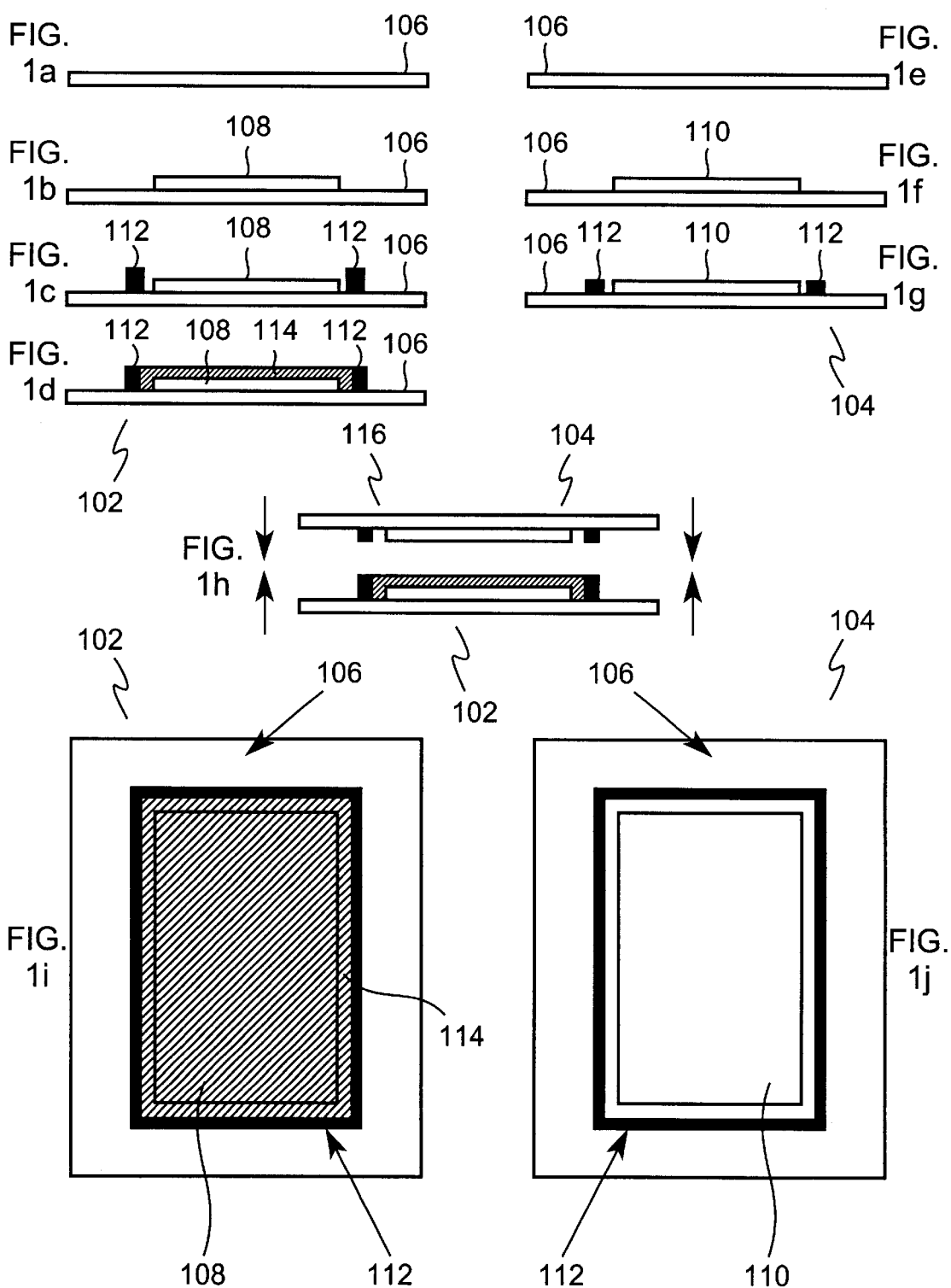
FIG. 1(a)–(j) illustrates exemplary process flow diagrams for forming an anode electrode, a cathode electrode and an electrochemical cell in accordance with a first aspect of the invention.
Figure 2:
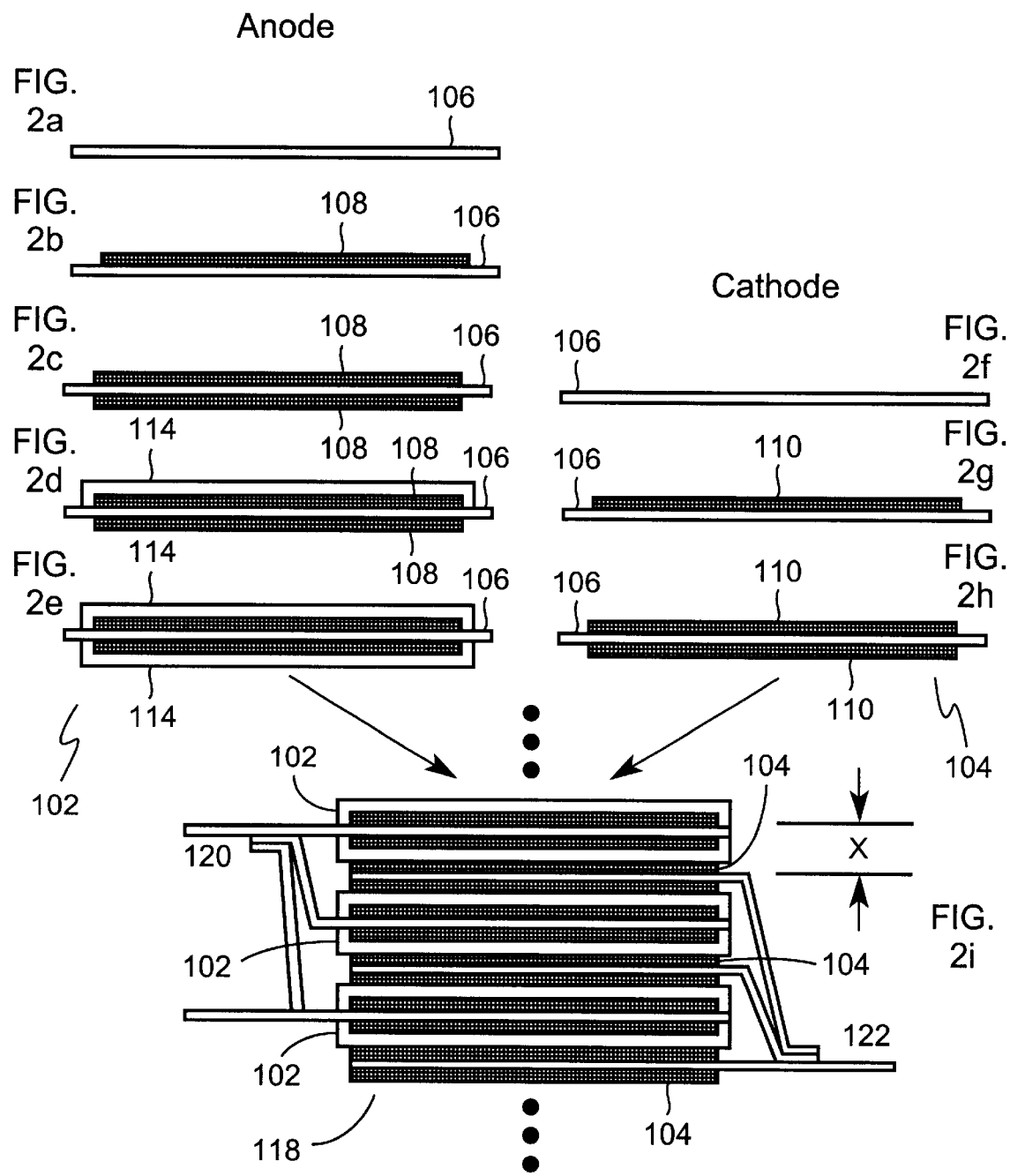
FIG. 2(a)–(I) illustrates exemplary process flow diagrams for forming an anode electrode, a cathode electrode and an electrochemical cell in accordance with a second aspect of the invention.

The foregoing objectives are met by the methods, electrodes and electrochemical cells of the present invention.

According to a first aspect of the invention, a method of forming an electrode suitable for use in an electrochemical cell is provided. The method comprises the steps of:

(a) forming an electrode slurry from components comprising a solvent, a polymeric binder material and a solid electrode material, wherein the polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule;

(b) coating the electrode slurry on a substrate; and (c) evaporating the solvent.

In accordance with a further aspect of the invention, an electrode suitable for use in an electrochemical cell is provided. The electrode comprises a substrate and a coating on the substrate. The coating comprises a polymeric binder material and a solid electrode material. The polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule.

In accordance with yet a further aspect of the invention, an electrochemical cell is provided. The electrochemical cell comprises:

(a) an anode comprising an anode coating on a first current collector. The anode coating comprises a polymeric anode material and a solid electrode material, wherein the polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule;

(b) a cathode, comprising a cathode coating on a second current collector. The cathode coating comprises a polymeric binder material and a solid cathode material. The polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule; and (c) an electrolyte providing a conducting medium between said anode and said cathode.

DETAILED DESCRIPTION OF THE PREFERRED EMBODIMENTS OF THE INVENTION

The invention will now be described with reference to FIG. 1(a)–(j), which illustrates an exemplary process flow for forming an anode electrode 102 and a cathode electrode 104 in accordance with a first aspect of the invention.

First, an anode slurry or ink and a cathode slurry or ink are each formed. The anode slurry or ink is formulated as a mixture comprised of a solution of a polymeric binder material dissolved in a solvent into which a solid active anode material and a conductive additive have been dispersed. The components forming the slurry can be mixed together using means known to persons skilled in the art.

The polymeric binder material is a chlorinated polyolefin formulated by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule. Such a material is disclosed as a hardenable coating composition for polypropylene resins in U.S. Pat. No. 4,683,264, to Urata et al, the entire content of which is herein incorporated by reference. The present invention makes novel use of such composition as an electrode binder material. A polymeric material commercially available under the trade name SUPERCHLON® (Nippon Paper Industries Co., LTD., Tokyo, Japan), has been found to work particularly well as a binder in accordance with the invention. The polymeric binder material is typically present in an amount of from about 1 to 16 wt %, preferably from about 4 to 8 wt %, based on the total solids content of the anode slurry or ink.

The solvent used in forming the anode can be, for example, toluene, xylene, 1,1,1-trichloroethane, cyclohexane, methyl cyclohexane, ethyl cyclohexane, methyl isobutyl ketone, methyl ethyl ketone, n-methyl pyrrolidone, tetrahydronaphthalene or other aromatic hydrocarbon, chlorinated hydrocarbon, ethyl acetate, n-butyl acetate, or mixtures thereof. Other suitable solvents are known to persons skilled in the art.

To reduce the viscosity of the slurry and achieve desirable application properties, it may be desirable to also employ a diluent for the above solvents. Depending on the specific application, use of a diluent may be beneficial as a less costly alternative to the use of a solvent alone where the addition of liquid is desired. The diluent may be employed to reduce the viscosity of the slurry, or to increase or decrease the vapor pressure of the ink, causing the ink to evaporate faster or slower. The diluent may also serve as a wetting agent to help the ink to flow on the substrate to which it is applied. Suitable diluents include, for example, various esters such as methyl formate, methyl acetate, ethyl formate, ethyl acetate, propyl acetate, butyl acetate, methyl propionate, methyl n-butyrate, methyl benzoate and ethyl benzoate, and alcohols such as methyl, ethyl, n-propyl, isopropyl, n-butyl, isobutyl, n-octyl, allyl and benzyl alcohols, ethylene glycol and glycerol.

The active anode material is preferably an intercalateable carbon such as XP calcined coke (Conoco Inc., Ponca City, Okla.) or LONZA® KS44 graphite (Lonza Co., Fair Lawn, N.J.), or other carbonaceous materials known to intercalate lithium. The active anode material can also be an intermetallic alloy of lithium with another metal or metals such as aluminum (Al), silicon (Si), tin (Sn) and the like. Other suitable active anode materials include, for example, certain transition metal oxides such as $WO_2$, $Nb_2O_5$, $MoO_2$ and $SnO_2$, and a sulfide such as $TiS_2$. The active anode material is typically present in an amount of from about 75 to 98 wt %, preferably from about 90 to 98 wt %, based on the total solids content of the anode slurry or ink.

The conductive additive is typically a carbon or graphite. Suitable materials which are commercially available include, for example, Shawinigan Acetylene Black® (Chevron Chemical Co., Houston, Tex.), VULCAN® XC72 (Cabot Corporation, Billerica, Mass.), graphite (UCAR Carbon Company, Parma, Ohio), or any of a large number of other carbon products or mixtures of carbons known to those skilled in the art. The specific carbon or mixture of carbons is selected to increase the electrical conductivity of the anode composite and to adjust the thixotropy of the anode slurry to optimize the coating or printing process. The conductive additive is typically present in an amount of from about 2 to 15 wt %, preferably from about 4 to 10 wt %, based on the total solids content of the anode slurry or ink.

The cathode slurry or ink is formulated in a similar manner to the anode slurry or ink. It is a mixture comprised of a solution of a polymeric binder material dissolved in a suitable solvent into which a solid particulate active cathode material and a conductive additive have been dispersed. The component descriptions for the polymeric binder, solvent, diluent and conductive additive for the cathode slurry or ink, including amounts, are the same as those set forth above with reference to the anode electrode, unless otherwise noted.

As the active cathode material, suitable materials include, for example, manganese oxide ($MnO_2$), lithiated manganese oxides ($Li_xMnO_2$, $Li_xMn_2O_4$), lithiated cobalt oxide ($Li_xCoO_2$), lithiated vanadium oxides ($Li_xV_2O_5$, $Li_xV_6O_{13}$), lithiated nickel oxide ($Li_xNiO_2$), mixed oxides of manganese, cobalt, vanadium and nickel, or sulfides of iron ($FeS_2$), cobalt ($CoS_2$), molybdenum ($MoS_2$) and titanium ($TiS_2$), or carbon monofluoride $(CF)_x$. The active cathode material is typically present in an amount of from about 75 to 98 wt %, preferably from about 90 to 98 wt %, based on the total solids content of the cathode slurry or ink.

After formation of the anode and cathode slurries or inks, they are each coated onto a respective current collector 106 to form anode coating layer 108 and cathode coating layer 110 thereon. Suitable current collectors are known in the art and are typically aluminum or copper foils which have been depassivated prior to the coating process.

The coating can be carried out by any number of well known techniques, for example, by electrostatic coating, dip coating, spray coating, roll coating, doctor blade, gravure coating and screen printing methods. The anode and cathode slurry or ink are each typically coated to a thickness of from about 5 to 250 μm, preferably from about 10 to 80 μm.

The solvent is removed from the anode and cathode slurry or ink by evaporation using a heating means, such as a convective oven or vacuum oven. Typically, the evaporation is conducted at a temperature of from about 60 to 120° C., and for a period of from about 1 to 16 hours until the solvent is removed. The temperature and duration of the evaporation process will depend strongly on the specific solvent that is used in the ink formulation.

After the anode layer and the cathode layer have dried, the anode and cathode structures can be subjected to a pressing or rolling treatment by means of, for example, a press plate or calender mill. Such treatment will flatten and compact the anode or cathode coating layer to allow for a more uniform and desired electrode thickness to be obtained. The final thickness of the anode and cathode coating layers after this treatment are typically from about 10 to 50 μm.

In the case in which the final electrochemical cell is formed from a single anode and cathode, seals 112 can next be printed or otherwise coated onto the current collectors around the perimeter of the anode layer 108 and the cathode layer 110. The function of the seals is to contain the electrolyte within the cell after assembly. They can advantageously be formed using the same polymeric material employed as the binder material for the electrodes with the following differences.

Instead of the active anode or cathode material, a small fraction of an inert, nonconductive material is used to prevent a short circuit when the polymer is melted in the sealing operation. The nonconductive material is typically selected from silicon oxide compounds such as fumed silica, silica gel, silica aerogel, silica xerogel, silica hydrogel, silica sol and colloidal silica, or alumina, magnesia, kaolin, talc, diatomaceous earth, calcium silicate, aluminum silicate, calcium carbonate, magnesium carbonate and combinations thereof. The nonconductive material is typically blended with the polymer material in a weight ratio of from about 2:98 (2 wt % nonconductive material to 98 wt % polymer) to 15:85, preferably from about 2:98 to 5:95.

After forming seals 112 around anode layer 108 and cathode layer 110, an electrolyte is next added to the anode and cathode layers. The electrolyte is preferably nonaqueous and is typically a lithium salt dissolved in a nonaqueous solvent. Suitable lithium salt include, for example, $LiPF_6$, $LiBF_4$, $LiAsF_6$, $LiClO_4$, $LiAlCl_4$, $LiCF_3SO_3$, $LiN(CF_3SO_2)_3$, $LiC(CF_3SO_2)_3$ and mixtures thereof.

The nonaqueous solvent is preferably selected from, but is not limited to, the group consisting of dimethyl sulfoxide, sulfolane, ethylene carbonate, propylene carbonate, dimethyl carbonate, diethyl carbonate, methyl ethyl carbonate, 1,2-dimethoxyethane (monoglyme), 1,2-diethoxyethane, γ-buterolactone, γ-valerolactone, 1,3-dioxolane, tetrahydrofuran, 2-methyltetrahydrofuran, if acetonitrile, proprionitrile, diglyme, triglyme, methyl fortnate, trimethyl phosphate, triethyl phosphate and mixtures thereof.

A separator coating 114 is next formed on the anode and/or the cathode for purposes of preventing shorting of the cell when the anode and cathode electrodes are stacked opposing one another. In the exemplary embodiment, separator 114 is formed over anode layer 108 and on the current collector inside of the region bounded by seals 112.

Typically, separator 114 is comprised of mats, pellets, papers, cloths or polymer sheets which contain an electrolyte within their pore structures. Preferably, a separator ink is printed or coated onto the surface of the anode 102 or cathode electrode 104. Suitable methods of preparing microporous separators from an ink solution are disclosed in U.S. Pat. No. 5,865,860 and in copending application Ser. Nos. 08/767,468, filed Jun. 19, 1996, Ser. No. 08/847,098, filed May 1, 1997, (Attorney Docket No. IMRAA.016A, Client Docket No. IM-074), filed on even date herewith, the entire contents of which applications are herein incorporated by reference.

The electrolyte can advantageously be added to the anode and cathode layers using an ink jet printer so as to prevent wetting of the surface of seals 112 with electrolyte prior to thermally sealing the cell. Such an electrolyte filling process is disclosed, for example, in U.S. Pat. No. 5,865,860, the entire contents of which are herein incorporated by reference. Other known electrolyte filling methods can alternatively be used.

The electrolyte-impregnated anode 102 and cathode 104 are stacked on top of one another in such a fashion as to align seals 112, as shown in FIG. 1(h), to form an electrochemical cell 116. The cell can be sealed by applying heat to the perimeter thereof in the vicinity of seals 112 to melt and seal the two opposing seals together.

The exemplary electrochemical cell illustrated in FIG. 1 includes a single anode and cathode unit. It is possible to apply the present invention to an electrochemical cell 118 having a plurality of such anode 102 and cathode 104 units, as illustrated in FIG. 2(a)–(I). In such a case, two anode layers 108 and two cathode layers 110 are typically formed for each anode 102 and cathode 104, respectively. The layers are formed on opposite surfaces of the current collectors 106. As shown, a separator 114 is formed for each of the anode layers 108 to prevent contact between anode layers and cathode layers in the final structure. The separators can additionally or alternatively be formed on cathode layers 110. It is noted that the seals formed around the perimeter of the anode and cathode layers in the single anode-single cathode cell of FIG. 1 are not present in the exemplary cell of FIG. 2.

The anodes 102 and cathodes 104 are alternately stacked in an array as shown in FIG. 2(I). The electrochemical cell 118 is placed into a container (not shown), and the anode and cathode current collectors 106 are each connected to a respective terminal or electrical feedthrough 120, 122 in the container. Electrolyte is then added to the cell, and the cell is sealed. Electrolyte can additionally be added to the anode and cathode layers as described above with reference to the electrochemical cell of FIG. 1. Examples of suitable electrolytes are also set forth above with reference to the cell of FIG. 1.

In order to further illustrate the present invention and the advantages thereof, the following specific examples are given, it being understood that same are intended only as illustrative and in nowise limitative.

EXAMPLES

Example 1

Solutions having 20% by weight each of SUPERCHLON® 822S, SUPERCHLON® 803MWS, and SUPERCHLON® 814HE were prepared in xylene. A solution having 20% by weight of EPDM (NORDEL® 2722EPEL, DUPONT, Wilmington, Del.) was prepared in hexane. And a solution having 20% by weight of PVDF (KYNAR® 2801, Elf Atochem North America, Philadelphia, Pa.) was prepared in 1-methyl-2-pyrrolidinone. These resin solutions were cast onto aluminum foil and allowed to dry at ambient temperature.

A solution having 10% by weight of solid epoxy resin (Dow D.E.R. 662UH) was prepared in 2-butanone. This solution is designated A1.

A solution having 10% by weight of poly(bisphenol A-co-epichlorohydrin) (molecular weight 1075 g/mole) was prepared in dichloromethane. This solution is designated A2.

With continued mixing, 5.0 g of solution A1 was added to the 20% by weight solution of SUPERCHLON® 822S. After the addition was complete, the solution was stirred for ten more minutes. Next, triethylamine, was added dropwise with continued stirring to catalyze the crosslinking reaction. The quantity of triethylamine was equal to 50% by weight of the epoxy content in the solution. After this addition, the solution was stirred for another 5 minutes. This solution was then cast onto aluminum foil and allowed to dry to tackiness at ambient temperature. This sample is designated SUPERCHLON® 822S-Epoxy Resin.

With continued mixing, 5.0 g of solution A2 was added to the 20% by weight solution of SUPERCHLON® 822S. After the addition was complete, the solution was stirred for ten more minutes. Next, triethylamine was added dropwise with continued stirring to catalyze the crosslinking reaction. The quantity of triethylamine was equal to 50% by weight of the poly(bisphenol A-co-epichlorohydrin) content in the solution. After this addition, the solution was stirred for another 5 minutes. This solution was then cast onto aluminum foil and allowed to dry to tackiness at ambient temperature. This sample is designated SUPERCHLON® 822S-epichlorohydrin.

All of the cast polymer films were baked in a vacuum oven overnight at 100° C. On the following day, each of the polymer film castings were cut into small pieces approximately 0.5 cm×0.5 cm square. Approximately 1.0 g of each casting was placed into a separate vial. Then 6.0 g of electrolyte solvent was added to each vial, and each vial was tightly capped. The electrolyte solvent consisted of 50% by volume ethylene carbonate and 50% by volume dimethyl carbonate (EC/DMC solvent, density 1.20 g/ml). All of the vials were placed into an oven at 100° C. After one week, the vials were removed from the oven and allowed to cool to room temperature. The solution from each vial was decanted into a separate tared vial, and the total mass of solution was recorded. The solvent was then evaporated to dryness in a vacuum oven at 130° C., and the vials were weighed again to determine the mass of the polymer residue. All experiments were performed in quadruplicate. The solubility of the polymer was computed from the mass of the polymer residue divided by the volume of the electrolyte solvent. The solubilities of the polymers are summarized in Table 1, below.

TABLE 1

| Binder Material | Solubility in EC/DMC Solvent at 100 ° C. |
| --- | --- |
| SUPERCHLON ® 814HE | 13.4 ± 1.0 mg/ml |
| PVDF | 7.8 ± 0.4 mg/ml |
| SUPERCHLON ® 803MWS | 7.3 ± 0.9 mg/ml |
| SUPERCHLON ® 822S | 0.8 ± 0.2 mg/ml |
| SUPERCHLON ® 822S-epoxy resin | 0.5 ± 0.2 mg/ml |

TABLE 1-continued

| Binder Material | Solubility in EC/DMC Solvent at 100 °C. |
|---|---|
| SUPERCHLON® 822S-epichlorohydrin | 0.5 ± 0.1 mg/ml |
| EPDM | 0.4 ± 0.1 mg/ml |

Based on the obtained data, it is clear that the samples of SUPERCHLON® 822S and the crosslinked samples of SUPERCHLON® 822S exhibit very low solubility in the ethylene carbonate/dimethyl carbonate electrolyte solvent.

Example 2

An anode ink was formulated by dissolving SUPERCHLON® 822S in THN (1,2,3,4-tetrahydronaphthalene) solvent to yield a 10% by weight solution of SUPERCHLON® 822S. This solution was added to a weighed quantity of XP calcined coke (Conoco Inc., Ponca City, Okla.) and carbon (Shawinigan Black®, Chevron Chemical Co., Houston, Tex.) to form a paste with the proportional composition of 84 parts of coke to 8 parts of carbon to 8 parts of SUPERCHLON® by weight. This paste was blended on a three roll mill. During the milling operation, the solvent composition was adjusted to optimize the ink viscosity for subsequent printing. Typically, the solvent content of the ink ranges from 60% to 95%. The anode ink was screen printed onto a copper foil current collector in a 15 cm² rectangular pattern of 3 cm width×5 cm length. The ink was dried in a vacuum oven at 100° C. for 16 hours. This process yielded a Cu/anode element.

A microporous separator was formulated from an ink solution as follows. The separator ink was formulated by dissolving SUPERCHLON® 822S in THN (1,2,3,4-tetrahydronaphthalene) solvent to yield a 10% by weight solution of SUPERCHLON® 822S. This solution was added to a weighed quantity of silica aerogel (SilCRON® G-130, 300 m²/g, SCM Corporation, Baltimore, N.Mex.; this aerogel was surface modified to improve dispersion in the ink solvent).

Enough solution was added to the silica aerogel to yield a binder to silica ratio of 30/70 by weight. This paste was blended on a three roll mill. During the milling operation, the solvent composition was adjusted to optimize the ink viscosity for subsequent printing. Typically, the solvent content of the ink ranges from 60% to 95% by weight. This ink was screen printed in a rectangular pattern of 3.4 cm wide×5.4 cm long directly onto the anode described above. The separator overlapped the anode by 0.2 cm on all four sides. The ink was dried in a vacuum oven at 100° C. for 16 hours. This process yielded a Cu/anode/separator element.

A cathode ink was formulated by dissolving SUPERCHLON® 822S in THN (1,2,3,4-tetrahydronaphthalene) solvent to yield a 10% by weight solution of SUPERCHLON® 822S. This solution was added to a weighed quantity of $LiMn_2O_4$ (EM Industries Inc., Hawthorne, N.Y.) and carbon (Shawinigan Black®, Chevron Chemical Co., Houston, Tex.) to form a paste with the proportional composition of 82 parts of $LiMn_2O_4$ to 10 parts of carbon to 8 parts of SUPERCHLON® by weight.

This paste was blended on a three roll mill. During the milling operation, the solvent composition was adjusted to optimize the ink viscosity for subsequent printing. Typically, the solvent content of the ink ranges from 60% to 95% by weight. This cathode ink was screen printed onto an aluminum foil current collector in a 15 cm² rectangular pattern of 3 cm width×5 cm length. The ink was dried in a vacuum oven at 100° C. for 16 hours. This process yielded an Al/cathode element.

The Cu/anode/separator element was pressed against the Al/cathode element to yield a Cu/anode/separator/cathode/Al electrochemical cell. The complete electrochemical cell was placed into a laminated plastic envelope (Class PPD, Shield Pack Inc., West Monroe, La.). The copper foil anode current collector, and aluminum foil cathode current collector each extended beyond the outer edge of the plastic envelope so that these current collectors served as negative and positive terminals respectively of the cell once the envelope was sealed. Prior to sealing the cell, 2 ml of electrolyte were added to the cell. The electrolyte consisted of 1.0 M $LiClO_4$ in a solvent mixture of 2 parts by volume ethylene carbonate and 1 part by volume dimethyl carbonate. The cell was sealed after the electrolyte was added.

Figure 3:
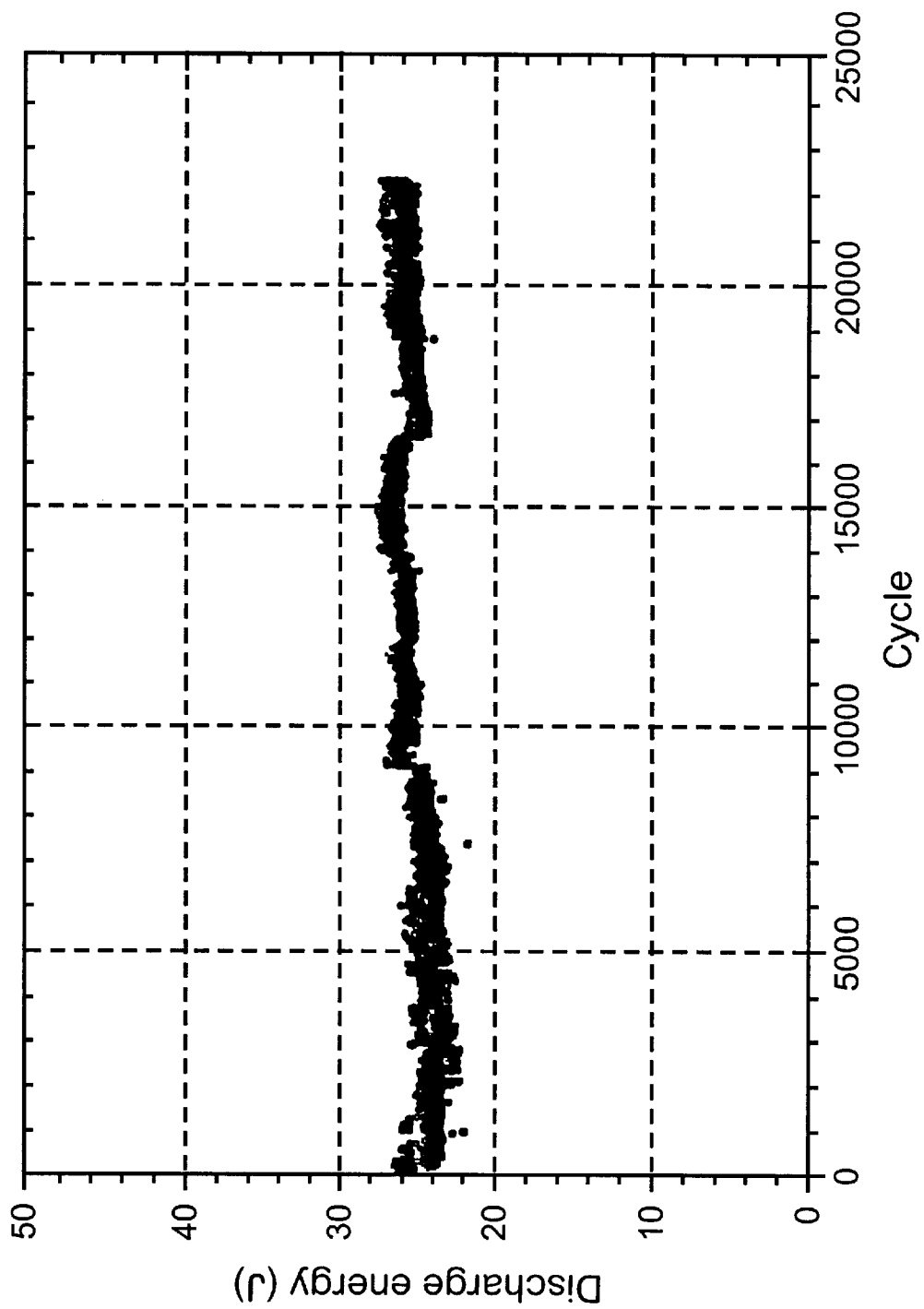
FIG. 3 is a graph of discharge energy versus cycles illustrating the extended life cycle of an electrochemical cell in accordance with one aspect of the invention.

This cell was then charged at a constant current of 30 mA to a cutoff voltage of 4.1 Volts, and then discharged at a constant current of 300 mA to a cutoff voltage of 3.2 Volts. This charge/discharge profile was repeated for 22,000 cycle. The energy delivered during discharge for each cycle is shown in the graph of FIG. 3. As can be seen from this graph, the electrochemical cell exhibited no deterioration in performance throughout the test.

While the invention has been described in detail with reference to specific embodiments thereof, it will be apparent to one skilled in the art that various changes and modifications can be made, and equivalents employed without departing from the scope of the claims.

What is claimed is:

1. A method of forming an electrode suitable for use in an electrochemical cell, comprising the steps of:

(a) forming an electrode slurry from components comprising a solvent, a polymeric binder material and a solid electrode material, wherein the polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule;

(b) coating the electrode slurry on a substrate; and (c) evaporating the solvent.

2. The method according to claim 1, wherein the components forming the electrode slurry further comprise a conductive additive.

3. The method according to claim 2, wherein the conductive additive is a carbon-containing conductive material.

4. The method according to claim 1, wherein the electrode is a cathode, and the solid electrode material is selected from the group consisting of manganese oxide, lithiated manganese oxides, lithiated cobalt oxides, lithiated vanadium oxides, lithiated nickel oxides, mixed oxides of two or more of manganese, cobalt, vanadium and nickel, sulfides of iron, cobalt, molybdenum and titanium, and carbon monofluoride.

5. The method according to claim 1, wherein the electrode is an anode, and the solid electrode material is selected from the group consisting of lithium intercalating materials, intermetallic alloys of lithium, transition metal oxides and sulfides.

6. The method according to claim 1, wherein the solvent is selected from the group consisting of toluene, xylene, 1,1,1-trichloroethane, cyclohexane, methyl cyclohexane, ethyl cyclohexane, methyl isobutyl ketone, n-methyl pyrrolidone, tetrahydronaphthalene, chlorinated hydrocarbons and mixtures thereof.

7. The method according to claim 6, wherein the solvent further comprises ethyl acetate, n-butyl acetate or ethyl methyl ketone.

8. The method according to claim 6, wherein the components of the electrode slurry further comprise an ester or an alcohol solvent diluent, and the diluent is evaporated with the solvent in step (c).

9. The method according to claim 1, further comprising subjecting the electrode to a pressing or rolling treatment after step (c).

10. The method according to claim 1, wherein the electrode slurry is coated on the substrates by electrostatic coating, dip coating, spray coating, roll coating, doctor blade, gravure coating, or screen printing.

11. The method according to claim 1, wherein the substrate is a current collector.

12. An electrode suitable for use in an electrochemical cell, comprising a substrate and a coating on the substrate, the coating comprising a polymeric binder material and a solid electrode material, wherein the polymeric binder material is formed by modifying a is polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule.

13. The electrode according to claim 12, wherein the coating further comprises a conductive additive.

14. The electrode according to claim 13 wherein the conductive additive is a carbon-containing conductive material.

15. The electrode according to claim 12, wherein the electrode is a cathode, and the solid electrode material is selected from the group consisting of manganese oxide, lithiated manganese oxides, lithiated cobalt oxides, lithiated vanadium oxides, lithiated nickel oxides, mixed oxides of two or more of manganese, cobalt, vanadium and nickel, sulfides of iron, cobalt, molybdenum and titanium, and carbon monofluoride.

16. The electrode according to claim 12, wherein the electrode is an anode, and the solid electrode material is selected from the group consisting of lithium intercalating materials, intermetallic alloys of lithium, transition metal oxides and sulfides.

17. The electrode according to claim 12, wherein the substrate is a current collector.

18. An electrochemical cell, comprising:
an anode, comprising an anode coating on a first current collector, the anode coating comprising a polymeric binder material and a solid anode material, wherein the polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule;

a cathode, comprising a cathode coating on a second current collector, the cathode coating comprising a polymeric binder material and a solid cathode material, wherein the polymeric binder material is formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule; and an electrolyte providing a conducting medium between said anode and said cathode.

19. The electrochemical cell according to claim 18, further comprising a separator interposed between the anode and cathode.

20. The electrochemical cell according to claim 19, wherein the electrolyte is a liquid contained within the pores of the separator.

21. The electrochemical cell according to claim 18, further comprising one or more additional anodes and one or more additional cathodes.

22. The electrochemical cell according to claim 18, wherein the anode and cathode further comprise a seal surrounding the anode coating and cathode coating, respectively, wherein the seal comprises a polymeric material formed by modifying a polyolefin with at least one unsaturated polycarboxylic acid or an anhydride of the acid, chlorinating the modified polyolefin and partially crosslinking carboxyl groups or acid anhydride groups on the chlorinated, modified polyolefin with an epoxy group of a compound which has at least two epoxy groups per molecule.

* * * * *